US011206190B1

United States Patent
Cannon et al.

(10) Patent No.: US 11,206,190 B1
(45) Date of Patent: Dec. 21, 2021

(54) USING AN ARTIFICIAL INTELLIGENCE BASED SYSTEM TO GUIDE USER DIALOGS IN DESIGNING COMPUTING SYSTEM ARCHITECTURES

(71) Applicant: International Business Machines Corporation, Armonk, NY (US)

(72) Inventors: Gray Franklin Cannon, Atlanta, GA (US); Sara Perelman, New York, NY (US); Marco Aurelio Stelmar Netto, Sao Paulo (BR); Vagner Figueredo de Santana, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/163,630

(22) Filed: Feb. 1, 2021

(51) Int. Cl.
*H04L 12/58* (2006.01)
*H04L 12/24* (2006.01)
(Continued)

(52) U.S. Cl.
CPC ............ *H04L 41/145* (2013.01); *G06N 5/04* (2013.01); *G06N 20/00* (2019.01); *H04L 41/16* (2013.01); *H04L 51/02* (2013.01); *H04L 51/16* (2013.01)

(58) Field of Classification Search
CPC ........ G06N 5/04; G06N 20/00; H04L 41/145; H04L 41/16; H04L 51/02; H04L 51/16;
(Continued)

(56) References Cited

U.S. PATENT DOCUMENTS 8,065,658 B1 11/2011 Bali
9,373,079 B2 6/2016 McDonald
(Continued)

FOREIGN PATENT DOCUMENTS

JP 2004309965 A 11/2004
KR 20180118590 A 10/2018

OTHER PUBLICATIONS

"Project Debater", IBM Research AI, last printed Jan. 29, 2021, 9 pages, <https://www.research.IBM.com/artificial-intelligence/project-debater/>.
(Continued)

*Primary Examiner* — Le H Luu
(74) *Attorney, Agent, or Firm* — Edward Li

(57) ABSTRACT

A computer-implemented method, a computer program product, and a computer system for using an artificial intelligence based system to guide user dialogs in designing computing system architectures. A server creates a dialog structure via a directed graph that includes nodes representing topics in discussion on designing a computing system architecture and edges each pointing from one node to another. In response to determining that an ongoing topic mismatches a topic supported to be currently discussed according to the dialog structure, the server interrupts the participants and notify the participants of a mismatch. In response to receiving from the participants a response of disagreement on the mismatch, the server creates an updated dialog structure with a new edge, where the new edge links from a node representing a previous topic to a node representing the ongoing topic. The updated dialog structure is followed by the participants in discussing the ongoing topic.

20 Claims, 8 Drawing Sheets

(51) Int. Cl.
*G06N 20/00* (2019.01)
*G06N 5/04* (2006.01)

(58) Field of Classification Search
CPC ......... H04L 65/40; H04L 67/12; A61B 5/164; G06F 16/95; G06F 40/56; G06Q 10/06398
See application file for complete search history.

(56) References Cited

U.S. PATENT DOCUMENTS

| | | | |
|---|---|---|---|
| 9,721,216 | B2 | 8/2017 | Lane |
| 9,998,342 | B2 | 6/2018 | Abou Mahmoud |
| 10,251,115 | B2 | 4/2019 | Coglon |
| 10,366,168 | B2 | 7/2019 | Wu |
| 10,560,662 | B1* | 2/2020 | Tippana ................. H04L 51/16 |
| 10,636,419 | B2 | 4/2020 | Kitajima |
| 10,757,044 | B2 | 8/2020 | Fawcett |
| 10,762,113 | B2 | 9/2020 | Jia |
| 10,803,860 | B2 | 10/2020 | Bharadwaj |
| 10,817,667 | B2 | 10/2020 | Yi |
| 10,839,154 | B2 | 11/2020 | Galitsky |
| 2003/0074648 | A1 | 4/2003 | Brassard |
| 2008/0059177 | A1 | 3/2008 | Poirier |
| 2013/0204618 | A1 | 8/2013 | Henry |
| 2015/0161513 | A1* | 6/2015 | Li ......................... A61B 5/164 706/11 |
| 2016/0117400 | A1* | 4/2016 | Agarwal ................. G06F 16/95 706/12 |
| 2018/0300395 | A1 | 10/2018 | Weinstein |
| 2019/0138597 | A1* | 5/2019 | Dowell ................. H04L 65/40 |
| 2019/0188582 | A1* | 6/2019 | Kephart .................. G06N 5/04 |
| 2019/0378076 | A1* | 12/2019 | O'Gorman ....... G06Q 10/06398 |
| 2020/0065728 | A1* | 2/2020 | Wilson .................. G06N 20/00 |
| 2020/0081939 | A1 | 3/2020 | Subramaniam |
| 2020/0244739 | A1* | 7/2020 | Auerbach ............... H04L 67/12 |
| 2020/0344185 | A1 | 10/2020 | Singaraju |
| 2021/0029065 | A1* | 1/2021 | Erhart ..................... H04L 51/02 |
| 2021/0109997 | A1* | 4/2021 | Nunex .................. G06F 40/56 |

OTHER PUBLICATIONS

Asher, et al., "Discourse Structure and Dialogue Acts in Multiparty Dialogue: the STAC Corpus", Proceedings of the Tenth International Conference on Language Resources and Evaluation (LREC'16), May 2016, pp. 2721-2727.

Jeuris, Steven, "Socratrees: Exploring the Design of Argument Technology for Layman Users", Cornell University Library, arXiv:1812.04478v4, Mar. 17, 2020, 19 pages.

Keith, Elise, "55 Million: A Fresh Look at the Number, Effectiveness, and Cost of Meetings in the U.S.", Lucid Meetings Blog, Dec. 4, 2015, 24 pages, <https://blog.lucidmeetings.com/blog/fresh-look-number-effectiveness-cost-meetings-in-US>.

Lawrence, et al., "Debating Technology for Dialogical Argument: Sensemaking, Engagement, and Analytics", ACM Transactions on Internet Technology, vol. 17, No. 3, Article 24, Mar. 2017, 23 pages.

Mell, et al., "The NIST Definition of Cloud Computing", National Institute of Standards and Technology, Special Publication 800-145, Sep. 2011, 7 pages.

Pallotta, et al., "Automatic argumentative analysis for interaction mining", Argument and Computation, vol. 2, Nos. 2-3, Jun.-Sep. 2011, pp. 77-106.

Sperrle, et al., "VIANA: Visual Interactive Annotation of Argumentation", Cornell University Library, arXiv: 1907.12413v1, Jul. 29, 2019, 12 pages.

* cited by examiner

100 # USING AN ARTIFICIAL INTELLIGENCE BASED SYSTEM TO GUIDE USER DIALOGS IN DESIGNING COMPUTING SYSTEM ARCHITECTURES

BACKGROUND

The present invention relates generally to artificial intelligence in designing computing system architectures, and more particularly to using an artificial intelligence based system to guide user dialogs in designing computing system architectures.

Information technology companies normally have to deliver services and products to clients, and a common phase for such deliveries is a specification of a system architecture (comprising both software and hardware). A specification of a system architecture is normally done via a set of meetings in a group of people with different skills, and, in such meetings, the selection of software and hardware components and interaction between software and hardware components are discussed.

The tremendous value in optimization of the meetings stems from both a clearer focus on solutions and reduction of time expense of the meetings. Time expense of the meetings has direct costs and opportunity costs which are particularly high for managers and technical resources. A study in 2015 estimates that the cost of ineffective meetings is greater than $70B annually in the United States alone.

Designing system architectures is time consuming, requiring many resources time, attention, and expertise. This important process lacks proper documentation and definition, causing the potential for poor decisions in technical team meetings.

SUMMARY

In one aspect, a computer-implemented method for using an artificial intelligence based system to guide user dialogs in designing computing system architectures is provided. The computer-implemented method includes creating a dialog structure via a directed graph that includes nodes representing topics in discussion on designing a computing system architecture and edges each pointing from one node to another. The computer-implemented method further includes monitoring the discussion. The computer-implemented method further includes, in response to determining that an ongoing topic mismatches a topic supported to be currently discussed according to the dialog structure, interrupting participants of the discussion and notifying the participants of a mismatch between the ongoing topic and the topic supported to be currently discussed. The computer-implemented method further includes in response to receiving from the participants a response of disagreement on the mismatch, creating an updated dialog structure with a new edge, where the new edge links from a node representing a previous topic to a node representing the ongoing topic. In the computer-implemented method, the updated dialog structure with the new edge is followed by the participants in the discussion.

In another aspect, a computer program product for using an artificial intelligence based system to guide user dialogs in designing computing system architectures is provided. The computer program product comprises a computer readable storage medium having program instructions embodied therewith, and the program instructions are executable by one or more processors. The program instructions are executable to create a dialog structure via a directed graph that includes nodes representing topics in discussion on designing a computing system architecture and edges each pointing from one node to another; monitor the discussion; in response to determining that an ongoing topic mismatches a topic supported to be currently discussed according to the dialog structure, interrupt participants of the discussion and notify the participants of a mismatch between the ongoing topic and the topic supported to be currently discussed; in response to receiving from the participants a response of disagreement on the mismatch, create an updated dialog structure with a new edge, where the new edge links from a node representing a previous topic to a node representing the ongoing topic. In the computer program product, the updated dialog structure with the new edge is followed by the participants in the discussion.

In yet another aspect, a computer system for using an artificial intelligence based system to guide user dialogs in designing computing system architectures is provided. The computer system comprises one or more processors, one or more computer readable tangible storage devices, and program instructions stored on at least one of the one or more computer readable tangible storage devices for execution by at least one of the one or more processors. The program instructions are executable to create a dialog structure via a directed graph that includes nodes representing topics in discussion on designing a computing system architecture and edges each pointing from one node to another. The program instructions are further executable to monitor the discussion. In response to determining that an ongoing topic mismatches a topic supported to be currently discussed according to the dialog structure, the program instructions are further executable to interrupt participants of the discussion and notify the participants of a mismatch between the ongoing topic and the topic supported to be currently discussed. In response to receiving from the participants a response of disagreement on the mismatch, the program instructions are further executable to create an updated dialog structure with a new edge, the new edge linking from a node representing a previous topic to a node representing the ongoing topic. In the computer system, the updated dialog structure with the new edge is followed by the participants in the discussion.

DETAILED DESCRIPTION

In embodiments of the present invention, an artificial intelligence based system assists users in a meeting of discussing the design of a computing system architecture to reach important decisions in the design. The artificial intelligence based system helps reduce meeting expense, and it also combats technical debt and poor decisions which can arise in the design and the discovery process and inhibit the long-term success of a project of the computing system architecture.

In embodiments of the present invention, the artificial intelligence based system and the knowledge about previous designs of computing system architectures are used to create a dialog structure for the design of the computing system architecture. The artificial intelligence based system monitors argument analysis during conversations among users (or participants of the meeting, or designers of the computing system architecture) and properly interrupts the users. The artificial intelligence based system guides the users to follow the dialog structure and meet discussion constraints and overall project goals (e.g., time and the design itself).

Figure 1:
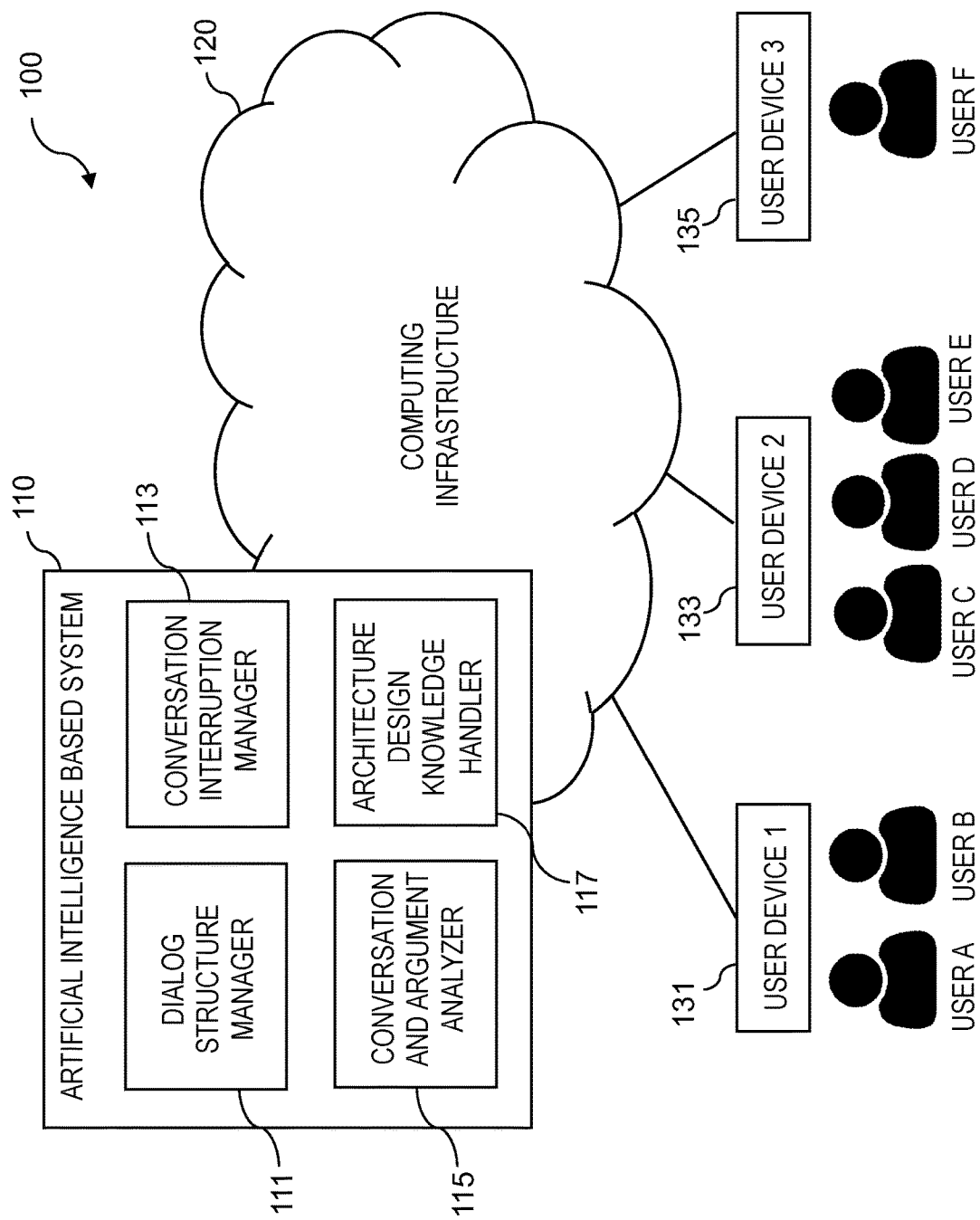
FIG. 1 is a systematic diagram illustrating a system including an artificial intelligence based system for guiding user dialogs in designing computing system architectures, in accordance with one embodiment of the present invention.

FIG. 1 is systematic diagram illustrating system 100 that includes artificial intelligence based system 110 for guiding user dialogs in designing computing system architectures, in accordance with one embodiment of the present invention. In system 100, users or participants A-F are people or artificial intelligence based entities participating in a discussion to define an IT (information technology) solution architecture or a computing system architecture. System 100 further includes user devices that enable communication and monitoring of conversations among multiple users or participants of the discussion (e.g., in a meeting). As an example, user device 1 131 is used by uses or participants A and B, user device 2 133 is used by users or participants C-E, and user device 3 135 is used by user or participant F. For example, user device 1 131, user device 2 133, and user device 3 135 may be multimedia equipment, including laptops, smartphones, and tablets. User device 1 131, user device 2 133, and user device 3 135 may be any electronic device or computing system capable of receiving input from a user, executing computer program instructions, and communicating with another computing system via a network.

System 100 further includes artificial intelligence based system 110. Artificial intelligence based system 110 is a proposed solution to assist users or participants A-F in defining an IT solution architecture or designing a computing system architecture. Artificial intelligence based system 110 includes four components: dialog structure manager 111, conversation interruption manager 113, conversation an argument analyzer 115, and architecture design knowledge handler 117. Dialog structure manager 111 constructs and updates a dialog structure which includes a data structure such as a graph and properties of the graph. Conversation interruption manager 113 determines when to interrupt users or participants A-F. Conversation interruption manager 113 provides insights or guidance on the alignment with the dialog structure constructed by dialog structure manager 111. Conversation and argument analyzer 115 monitors conversations among the users or participants A-F and analyzes the content being discussed against the data structure that represents the dialog and knowledge on the computing system architecture. Architecture design knowledge handler 117 handles information related to the design of the computing system architecture being discussed in the meeting.

As shown in FIG. 1, system 100 further includes computing infrastructure 120. Computing infrastructure 120 is a set of computing infrastructure components hosting artificial intelligence based system 110 and all necessary data. Computing infrastructure components includes computing devices or servers, networks, storage, and etc.

Artificial intelligence based system 110 may be implemented on one or more computing devices or servers. A computing device or server is described in more detail in later paragraphs with reference to FIG. 3. Artificial intelligence based system 110 may be implemented in a cloud computing environment. The cloud computing environment is described in more detail in later paragraphs with reference to FIG. 4 and FIG. 5.

Communications among artificial intelligence based system 110, user device 1 131, user device 2 133, and user device 3 135 may be through a network that can be any combination of connections and protocols which support communications among the computing devices or servers. For example, the network may be the Internet which represents a worldwide collection of networks and gateways to support communications between devices connected to the Internet; the network may be implemented as an intranet, a local area network (LAN), a wide area network (WAN), or a wireless network.

FIG. 2(A), FIG. 2(B), FIG. 2(C), and FIG. 2(D) present a flowchart showing operational steps of using an artificial intelligence based system (such as artificial intelligence based system 110 shown in FIG. 1) to guide user dialogs in designing a computing system architecture, in accordance with one embodiment of the present invention. The operational steps are implemented on a computing device or server hosting the artificial intelligence based system.

Figure 2A:
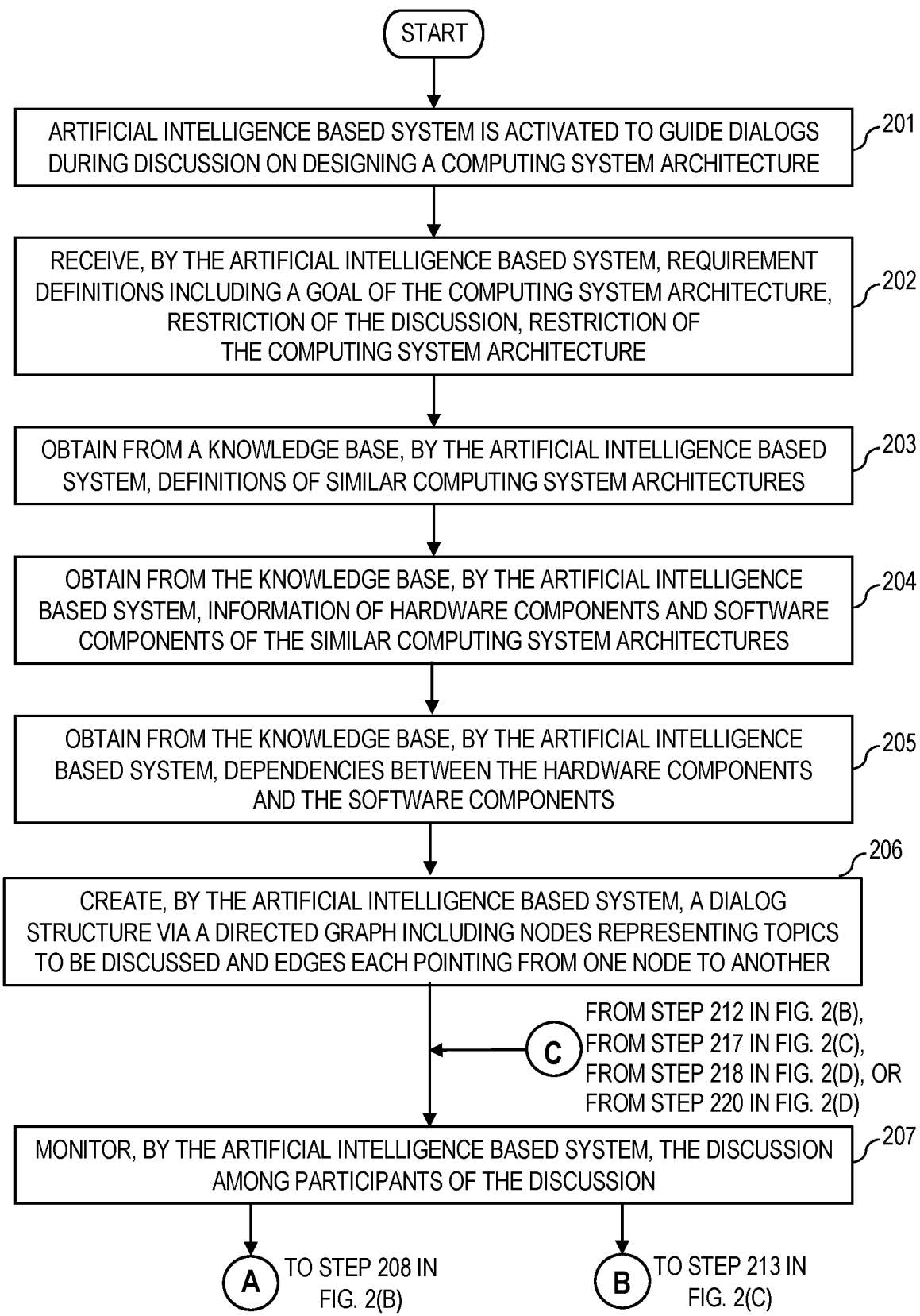
FIG. 2(A), FIG. 2(B), FIG. 2(C), and FIG. 2(D) present a flowchart showing operational steps of using an artificial intelligence based system to guide user dialogs in designing a computing system architecture, in accordance with one embodiment of the present invention.

Referring to FIG. 2(A), at step 201, the artificial intelligence based system is activated to guide dialogs during discussion on designing a computing system architecture. In one embodiment, the artificial intelligence based system activates itself when detecting that the discussion is initiated. For example, the artificial intelligence based system is automatically triggered when a web conference of the discussing is started. In another embodiment, participants of the discussion activate the artificial intelligence based system when starting the discussion.

Referring to FIG. 2(A), at step 202, the artificial intelligence based system receives requirement definitions of the computing system architecture. The requirement definitions include but are not limited to a goal of the computing system architecture, restriction of the discussion, and restriction of the computing system architecture. The requirement definitions are provided by the participants of the discussion. The goal of the computing system architecture may be, for example, to design hybrid cloud for aerospace workloads or to design on-premise back office support. For example, the restriction of the discussion may be a time limit of the discussion, the number of topics during the discussion, or to define at least 50% of the computing system architecture. For example, the restriction of the computing system architecture includes software, cost, and performance.

Referring to FIG. 2(A), at step 203, the artificial intelligence based system obtains, from a knowledge base, definitions of similar computing system architectures. The similar computing system architectures have been designed in previous projects and information of the similar computing system architectures has been stored in the knowledge base. In the embodiment shown in FIG. 1, the knowledge base is hosted by computing infrastructure 120.

Referring to FIG. 2(A), at step 204, the artificial intelligence based system obtains, from the knowledge base, information of hardware components and software components of the similar computing system architectures. At step 205, the artificial intelligence based system obtains, from the knowledge base, dependencies between the hardware components and the software components of the similar computing system architectures.

Referring to FIG. 2(A), at step 206, the artificial intelligence based system creates a dialog structure via a directed graph that includes nodes representing topics to be discussed and edges each pointing from one node to another. The dialog structure is generated based on pre-defined hardware and software layers (e.g., computing layer, storage layer, middleware layer, security layer, application layer, and user interface layer) of the similar computing system architectures. The amount of time for the discussion on a layer may be based on the number of possible components to be discussed in such a layer, or based on the amount of time spent in previous design discussion for each layer in the similar computing system architectures. In the directed graph, respective ones of the nodes include respective amounts of the time that should be used in the discussion. The dialog structure is created based on the requirement definitions received at step 202 and information about the similar computing system architectures obtained from the knowledge base at steps 203-205. The dialog structure created at step 206 may be stored in the knowledge base.

Referring to FIG. 2(A), at step 207, the artificial intelligence based system monitors the discussion among the participants of the discussion. The artificial intelligence based system keeps monitoring the discussion, while the artificial intelligence based system is running and the discussion is going on. While monitoring the discussion, the artificial intelligence based system will run step 208 shown in FIG. 2(B) and step 213 shown in FIG. 2(C).

Figure 2B:
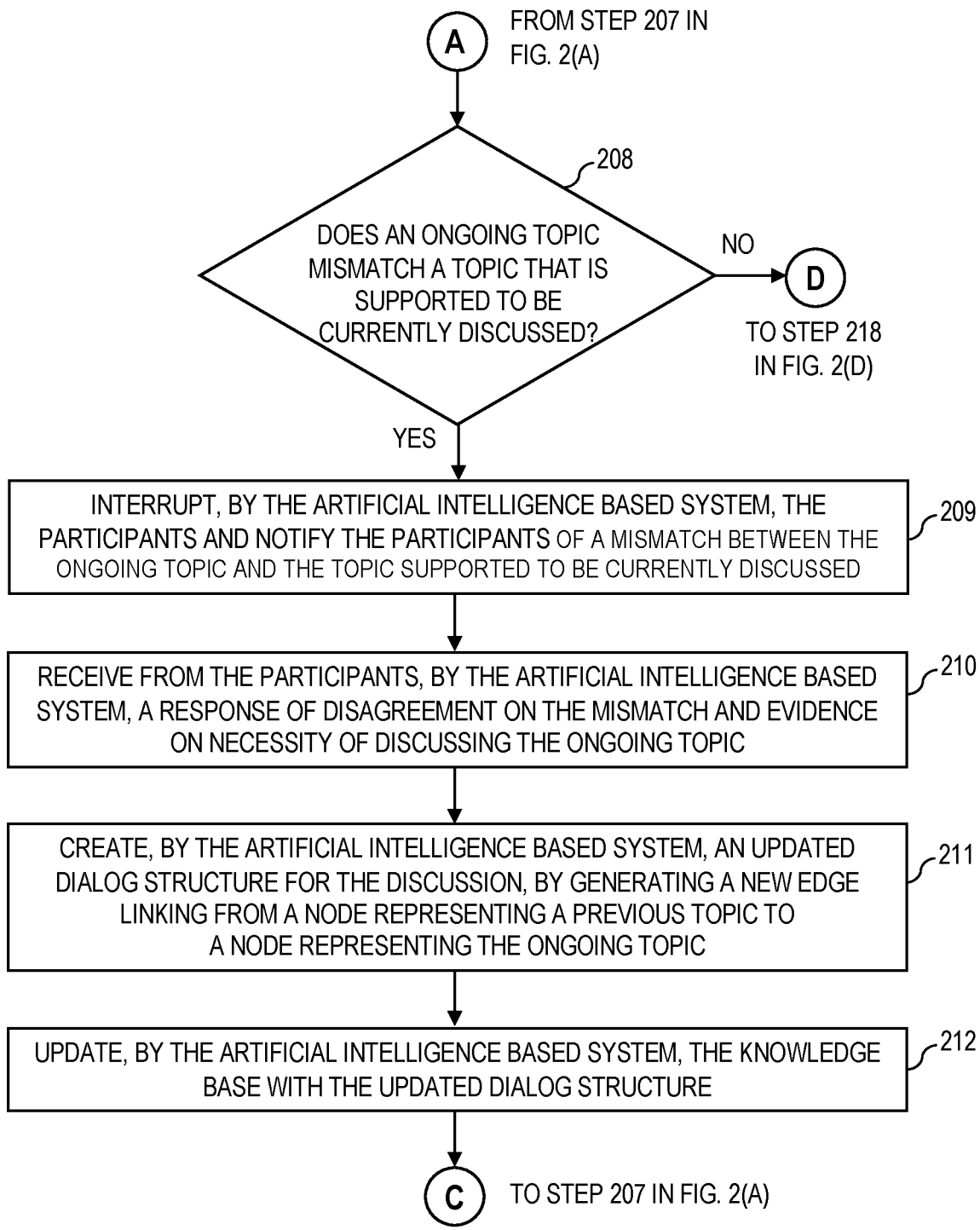

Now referring to FIG. 2(B), after step 207 shown in FIG. 2(A), the artificial intelligence based system at step 208 determines whether an ongoing topic mismatches a topic that is supported to be currently discussed according to the dialog structure. The artificial intelligence based system compares the ongoing topic to the supposed-to-be-discussed topic indicated in the dialog structure and then makes the determination.

Figure 2C:
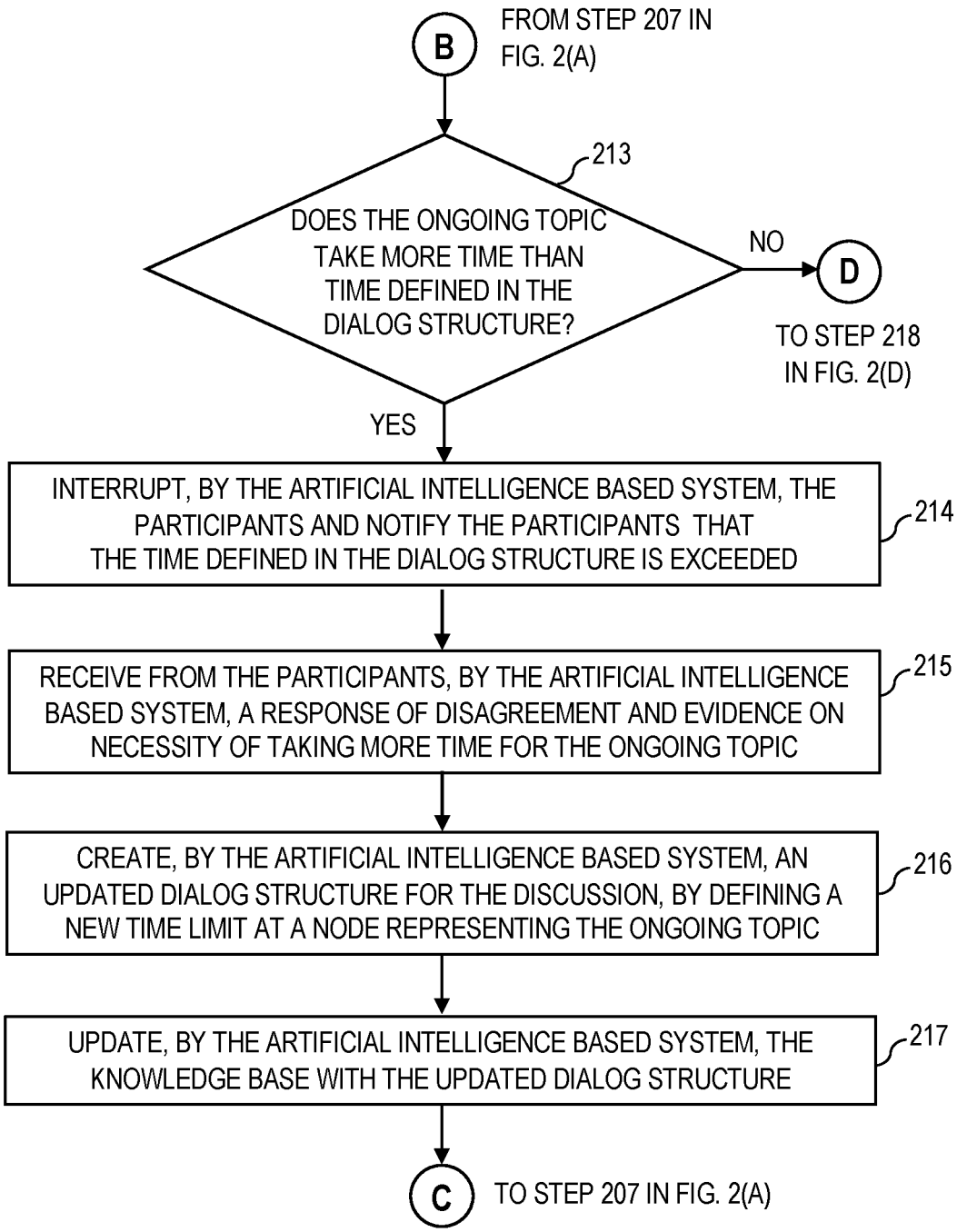
Figure 2D:
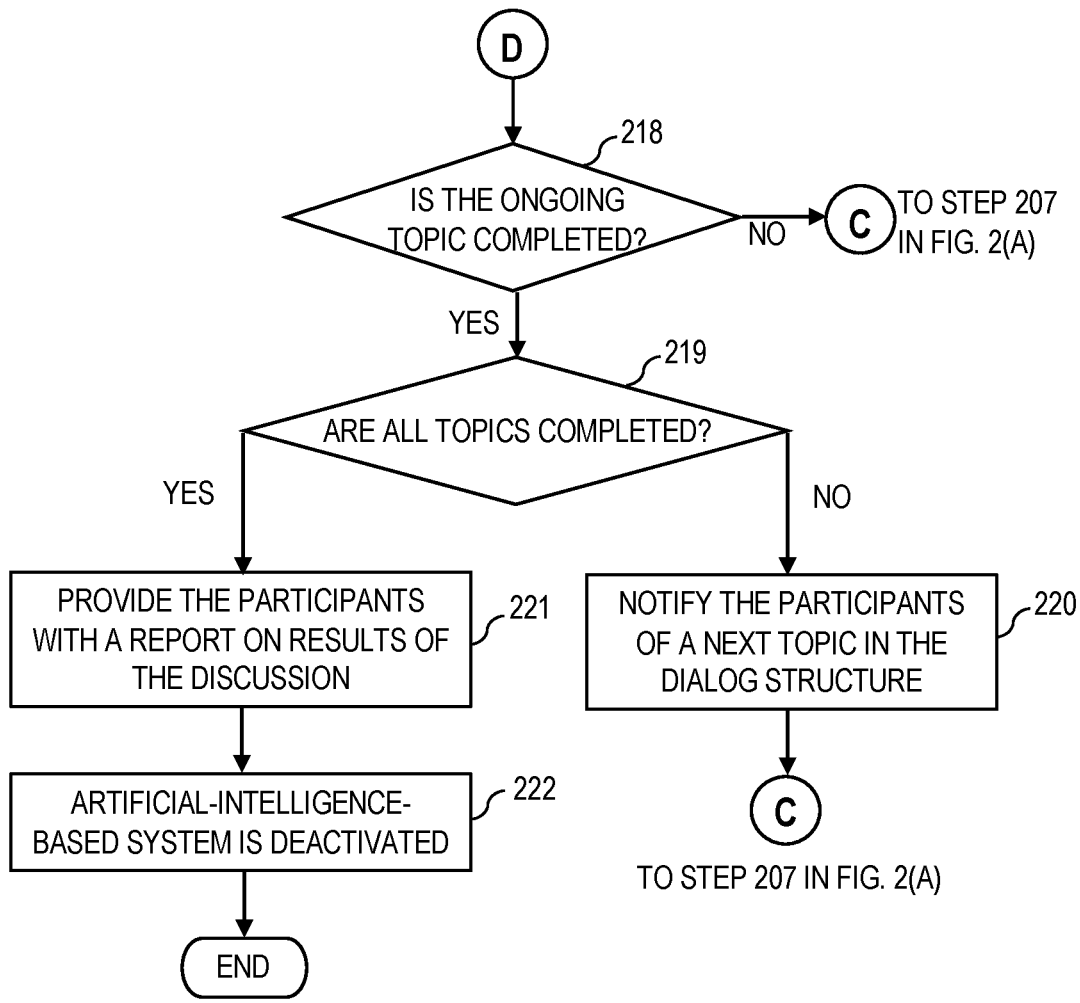

Referring to FIG. 2(B), in response to determining that the ongoing topic does not mismatch the topic supported to be currently discussed (NO branch of decision block 208), the artificial intelligence based system will execute step 218 shown in FIG. 2(D). In response to determining that the ongoing topic mismatches the topic supported to be currently discussed (YES branch of decision block 208), at step 209, the artificial intelligence based system interrupts the participants and notifies the participants of a mismatch between the ongoing topic and the topic supported to be currently discussed. The artificial intelligence based system suggests the topic that is supported to be currently discussed according to the dialog structure.

Upon receiving the notification about the mismatch, the participants respond the artificial intelligence based system. The participants of the discussion may agree with the artificial intelligence based system and then, under the guidance of the dialog structure given by the artificial intelligence based system, the participants of the discussion may change from discussing the ongoing topic to discussing the topic suggested by the dialog structure given by the artificial intelligence based system. Once the topic suggested by the artificial intelligence based system is discussed by the participants, the artificial intelligence based system will reiterate step 207 shown in FIG. 2(A) to continue monitoring the discussion.

Upon receiving the notification about the mismatch, the participants may disagree with the artificial intelligence based system. The participants may also sends to the artificial intelligence based system evidence on necessity of discussing the ongoing topic. Referring to FIG. 2(B), at step 210, the artificial intelligence based system receives, from the participants, a response of disagreement on the mismatch; the artificial intelligence based system may further receive the evidence on the necessity of discussing the ongoing topic.

Referring to FIG. 2(B), at step 211, the artificial intelligence based system creates an updated dialog structure for the discussion, by generating a new edge linking from a node representing a previous topic to a node representing the ongoing topic. The participants then keep the discussion on the ongoing topic, following the updated dialog structure for the discussion. At step 212, the artificial intelligence based system updates the knowledge base with the updated dialog structure. After step 212, the artificial intelligence based system reiterates step 207 shown in FIG. 2(A) and keeps monitoring the discussion among the participants.

Now referring to FIG. 2(C), after step 207 shown in FIG. 2(A), the artificial intelligence based system at step 213 determines whether the ongoing topic takes more time than time defined in the dialog structure. The artificial intelligence based system compares the time spent for discussing the ongoing topic to the amount of the time defined in the node representing the ongoing topic in the dialog structure.

Referring to FIG. 2(C), in response to determining that the ongoing topic does not take more time than the time defined in the dialog structure (NO branch of decision block 213), the artificial intelligence based system will execute step 218 shown in FIG. 2(D). In response to determining that the ongoing topic takes more time than the time defined in the dialog structure (YES branch of decision block 213), at step 214, the artificial intelligence based system interrupts the participants and notifies the participants that the time defined in the dialog structure is exceeded.

Upon receiving the notification that the ongoing topic takes more time than the time defined in the dialog structure, the participants respond the artificial intelligence based system. The participants of the discussion may agree with the artificial intelligence based system. If the participants agree, the participants may terminate the discussion of the ongoing topic and then proceed with discussing a next topic, following the guidance of the dialog structure given by the artificial intelligence based system. Once the next topic is discussed by the participants, the artificial intelligence based system will reiterate step 207 shown in FIG. 2(A) to monitor discussion on the next topic.

Upon receiving the notification that the ongoing topic takes more time than the time defined in the dialog structure, in a response to the artificial intelligence based system, the participants may disagree with the artificial intelligence based system. The participants may also sends to the artificial intelligence based system evidence on necessity of taking more time for the ongoing topic. Referring to FIG. 2(C), at step 215, the artificial intelligence based system receives, from the participants, a response of disagreement on the time defined in the dialog structure; the artificial intelligence based system may further receive the evidence on the necessity of taking more time for the ongoing topic.

Referring to FIG. 2(C), at step 216, the artificial intelligence based system creates an updated dialog structure for the discussion, by defining a new time limit at a node representing the ongoing topic. The participants then continue to discuss the ongoing topic, following the new time limit defined at the node representing the ongoing topic in the updated dialog structure for the discussion.

Referring to FIG. 2(C), at step 217, the artificial intelligence based system updates the knowledge base with the updated dialog structure. After step 217, the artificial intelligence based system reiterates step 207 shown in FIG. 2(A) and keeps monitoring the dialog among the participants.

Now referring to FIG. 2(D), in response to determining that the ongoing topic does not mismatch the topic supported to be currently discussed (NO branch of decision block 208 shown in FIG. 2(B)) or in response to determining that the ongoing topic does not take more time than the time defined in the dialog structure (NO branch of decision block 213 shown in FIG. 2(C)), the artificial intelligence based system at step 218 determines whether the ongoing topic is completed in the discussion.

Referring to FIG. 2(D), in response to determining that the ongoing topic is not completed in the discussion (NO branch of decision step 218), the artificial intelligence based system reiterates step 207 shown in FIG. 2(A) to monitor the discussion on the ongoing topic.

Referring to FIG. 2(D), in response to determining that the ongoing topic is completed in the discussion (YES branch of decision step 218), at step 219, the artificial intelligence based system determines whether all topics in the dialog structure are completed in the discussion.

Referring to FIG. 2(D), in response to determining that not all topics in the dialog structure are completed in the discussion (NO branch of decision step 219), at step 220, the artificial intelligence based system notifies the participants of a next topic in the dialog structure. The next topic will be set as a new ongoing topic to be discussed, and the artificial intelligence based system reiterates step 207 shown in FIG. 2(A) to monitor discussion on the next topic (the new ongoing topic).

Referring to FIG. 2(D), in response to determining that all topics in the dialog structure are completed in the discussion (YES branch of decision step 219), at step 221, the artificial intelligence based system provides the participants with a report on results of the discussion. This step marks the completion of the discussion session. At step 222, the artificial intelligence based system is deactivated. In one embodiment, the artificial intelligence based system deactivates automatically when detecting that the discussion session is completed. For example, the artificial intelligence based system automatically shuts off when a web conference of the discussion is ended. In another embodiment, the participants of the discussion deactivate the artificial intelligence based system when the discussion session is completed.

Figure 3:
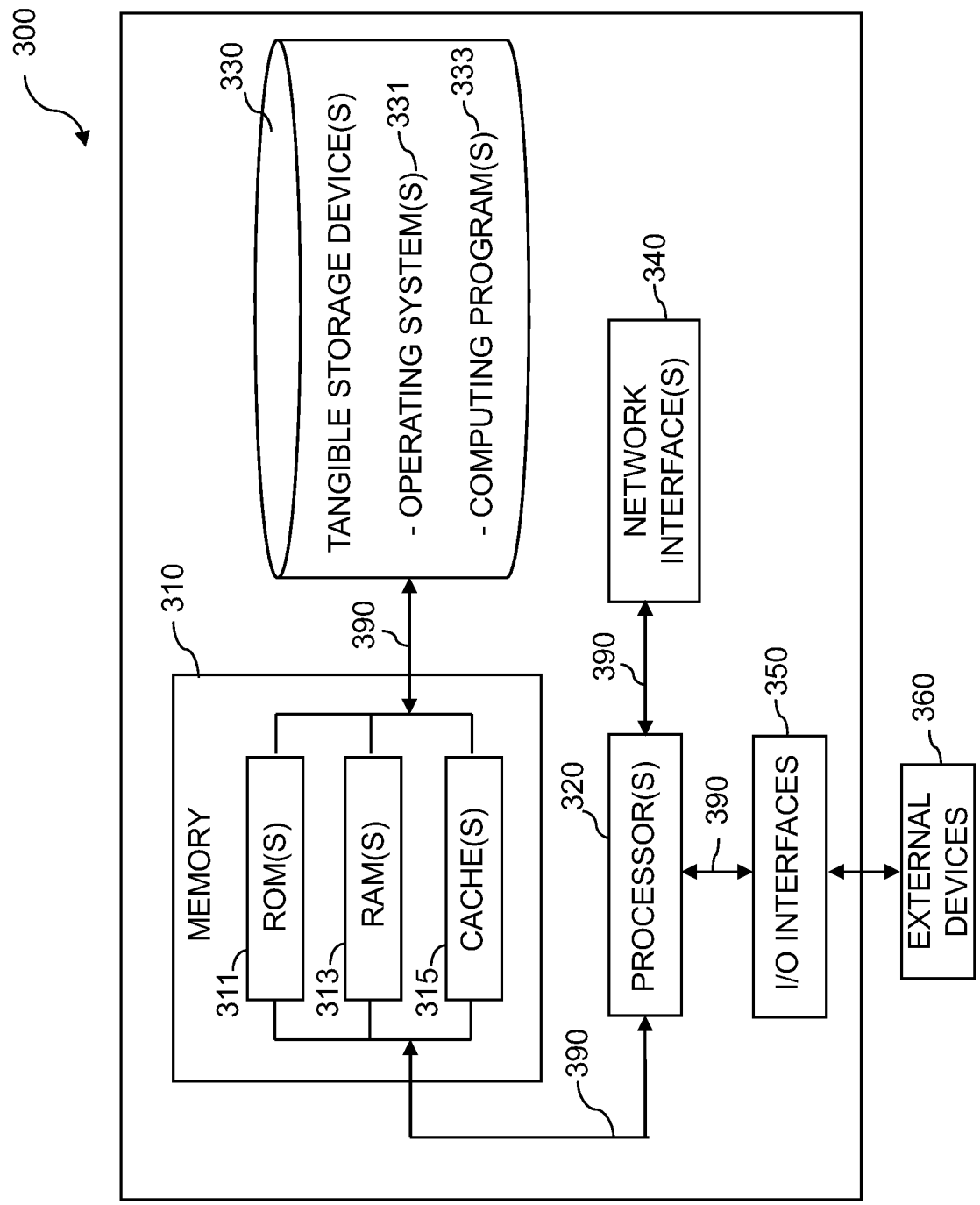
FIG. 3 is a diagram illustrating components of a computing device or server hosting an artificial intelligence based system for guiding user dialogs in designing computing system architectures, in accordance with one embodiment of the present invention.

FIG. 3 is a diagram illustrating components of computing device or server 300 hosting an artificial intelligence based system (such as artificial intelligence based system 110 shown in FIG. 1) for guiding user dialogs in designing computing system architectures, in accordance with one embodiment of the present invention. It should be appreciated that FIG. 3 provides only an illustration of one implementation and does not imply any limitations with regard to the environment in which different embodiments may be implemented.

Referring to FIG. 3, computing device or server 300 includes processor(s) 320, memory 310, and tangible storage device(s) 330. In FIG. 3, communications among the above-mentioned components of computing device or server 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer readable tangible storage device(s) 330.

Computing device or server 300 further includes I/O interface(s) 350. I/O interface(s) 350 allows for input and output of data with external device(s) 360 that may be connected to computing device or server 300. Computing device or server 300 further includes network interface(s) 340 for communications between computing device or server 300 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
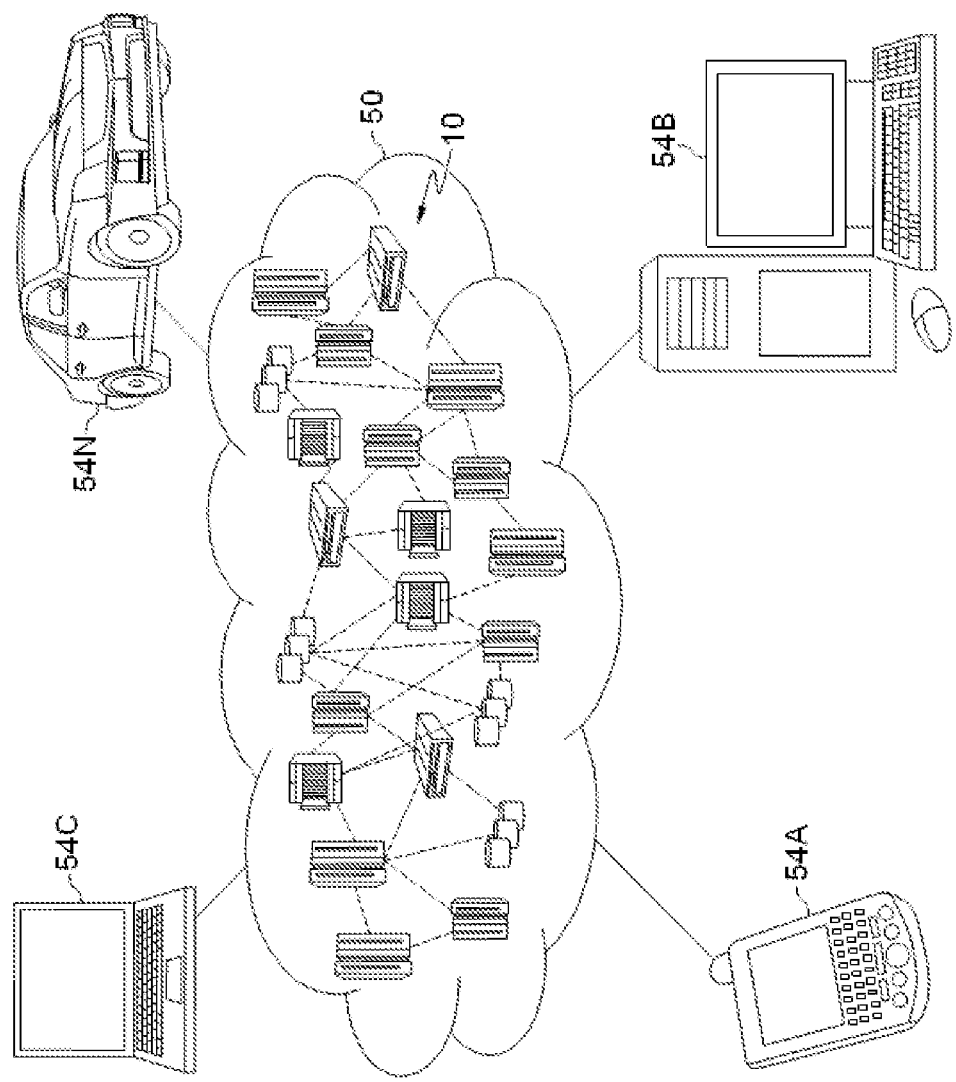
FIG. 4 depicts a cloud computing environment, in accordance with one embodiment of the present invention.

Referring now to FIG. 4, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 5:
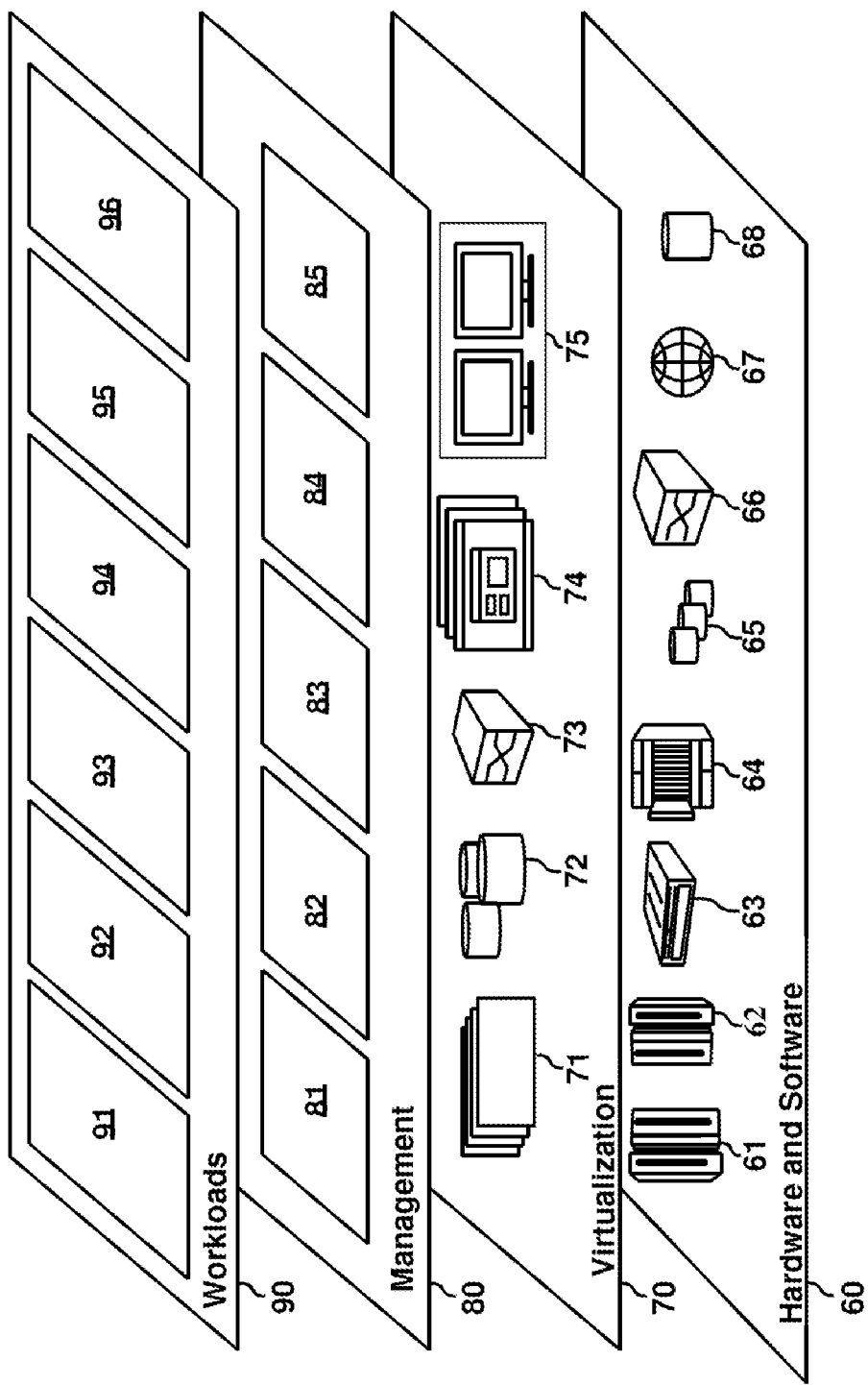
FIG. 5 depicts abstraction model layers in a cloud computing environment, in accordance with one embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of an artificial intelligence based system for guiding user dialogs in designing computing system architectures.

What is claimed is:

1. A computer-implemented method for using an artificial intelligence based system to user dialogs in designing computing system architectures, the method comprising:
    creating a dialog structure via a directed graph that includes nodes representing topics in discussion on designing a computing system architecture and edges each pointing from one node to another;
    monitoring the discussion;
    in response to determining that an ongoing topic mismatches a topic supported to be currently discussed according to the dialog structure, interrupting participants of the discussion and notifying the participants of a mismatch between the ongoing topic and the topic supported to be currently discussed;
    in response to receiving from the participants a response of disagreement on the mismatch, creating an updated dialog structure with a new edge, the new edge linking from a node representing a previous topic to a node representing the ongoing topic; and
    wherein the updated dialog structure with the new edge is followed by the participants in the discussion.

2. The computer-implemented method of claim 1, further comprising:
    in response to determining that the ongoing topic takes more time than time defined in the dialog structure, interrupting the participants and notifying the participants that the time defined in the dialog structure is exceeded;

in response to receiving from the participants a response of disagreement on the time defined in the dialog structure, creating an updated dialog structure with a new time limit at the node representing the ongoing topic; and wherein the updated dialog structure with the new time limit is followed by the participants in the discussion.

3. The computer-implemented method of claim 2, further comprising:

updating a knowledge base with the updated dialog structure with the new time limit.

4. The computer-implemented method of claim 1, further comprising:

updating a knowledge base with the updated dialog structure with the new edge.

5. The computer-implemented method of claim 1, further comprising receiving requirement definitions of the computing system architecture, the requirement definitions including a goal of the computing system architecture, restriction of the discussion, and restriction of the computing system architecture;

obtaining, from a knowledge base, definitions of similar computing system architectures, the similar computing system architectures having been designed in previous projects;

obtaining, from the knowledge base, information of hardware components and software components of the similar computing system architectures;

obtaining, from the knowledge base, dependencies between the hardware components and the software components; and wherein the dialog structure is created based on the requirement definitions and information about the similar computing system architectures obtained from the knowledge base.

6. The computer-implemented method of claim 1, further comprising:

in response to determining that the ongoing topic is completed in the discussion, determining whether all topics in the dialog structure are completed in the discussion;

in response to determining that all the topics in the dialog structure are completed in the discussion, providing the participants with a report on results of the discussion.

7. The computer-implemented method of claim 1, wherein the dialog structure is created based on pre-defined hardware and software layers of similar computing system architectures, wherein the similar computing system architectures have been designed in previous projects.

8. A computer program product for using an artificial intelligence based system to guide user dialogs in designing computing system architectures, the computer program product comprising a computer readable storage device having program instructions embodied therewith, the program instructions executable by one or more processors, the program instructions executable to:

create a dialog structure via a directed graph that includes nodes representing topics in discussion on designing a computing system architecture and edges each pointing from one node to another;

monitor the discussion;

in response to determining that an ongoing topic mismatches a topic supported to be currently discussed according to the dialog structure, interrupt participants of the discussion and notify the participants of a mismatch between the ongoing topic and the topic supported to be currently discussed;

in response to receiving from the participants a response of disagreement on the mismatch, create an updated dialog structure with a new edge, the new edge linking from a node representing a previous topic to a node representing the ongoing topic; and wherein the updated dialog structure with the new edge is followed by the participants in the discussion.

9. The computer program product of claim 8, further comprising the program instructions executable to:

in response to determining that the ongoing topic takes more time than time defined in the dialog structure, interrupt the participants and notify the participants that the time defined in the dialog structure is exceeded;

in response to receiving from the participants a response of disagreement on the time defined in the dialog structure, create an updated dialog structure with a new time limit at the node representing the ongoing topic; and wherein the updated dialog structure with the new time limit is followed by the participants in the discussion.

10. The computer program product of claim 9, further comprising the program instructions executable to:

update a knowledge base with the updated dialog structure with the new time limit.

11. The computer program product of claim 8, further comprising the program instructions executable to:

update a knowledge base with the updated dialog structure with the new edge.

12. The computer program product of claim 8, further comprising the program instructions executable to:

receive requirement definitions of the computing system architecture, the requirement definitions including a goal of the computing system architecture, restriction of the discussion, and restriction of the computing system architecture;

obtain, from a knowledge base, definitions of similar computing system architectures, the similar computing system architectures having been designed in previous projects;

obtain, from the knowledge base, information of hardware components and software components of the similar computing system architectures;

obtain, from the knowledge base, dependencies between the hardware components and the software components; and wherein the dialog structure is created based on the requirement definitions and information about the similar computing system architectures obtained from the knowledge base.

13. The computer program product of claim 8, further comprising program instructions executable to:

in response to determining that the ongoing topic is completed in the discussion, determine whether all topics in the dialog structure are completed in the discussion;

in response to determining that all the topics in the dialog structure are completed in the discussion, provide the participants with a report on results of the discussion.

14. The computer program product of claim 8, wherein the dialog structure is created based on pre-defined hardware and software layers of similar computing system architectures, wherein the similar computing system architectures have been designed in previous projects.

15. A computer system for using an artificial intelligence based system to guide user dialogs in designing computing system architectures, the computer system comprising one or more processors, one or more computer readable tangible storage devices, and program instructions stored on at least one of the one or more computer readable tangible storage devices for execution by at least one of the one or more processors, the program instructions executable to:
create a dialog structure via a directed graph that includes nodes representing topics in discussion on designing a computing system architecture and edges each pointing from one node to another;
monitor the discussion;
in response to determining that an ongoing topic mismatches a topic supported to be currently discussed according to the dialog structure, interrupt participants of the discussion and notify the participants of a mismatch between the ongoing topic and the topic supported to be currently discussed;
in response to receiving from the participants a response of disagreement on the mismatch, create an updated dialog structure with a new edge, the new edge linking from a node representing a previous topic to a node representing the ongoing topic; and
wherein the updated dialog structure with the new edge is followed by the participants in the discussion.

16. The computer system of claim 15, further comprising the program instructions executable to:
in response to determining that the ongoing topic takes more time than time defined in the dialog structure, interrupt the participants and notify the participants that the time defined in the dialog structure is exceeded;
in response to receiving from the participants a response of disagreement on the time defined in the dialog structure, create an updated dialog structure with a new time limit at the node representing the ongoing topic; and
wherein the updated dialog structure with the new time limit is followed by the participants in the discussion.

17. The computer system of claim 16, further comprising the program instructions executable to:
update a knowledge base with the updated dialog structure with the new time limit.

18. The computer system of claim 15, further comprising the program instructions executable to:
update a knowledge base with the updated dialog structure with the new edge.

19. The computer system of claim 15, further comprising the program instructions executable to:
receive requirement definitions of the computing system architecture, the requirement definitions including a goal of the computing system architecture, restriction of the discussion, and restriction of the computing system architecture;
obtain, from a knowledge base, definitions of similar computing system architectures, the similar computing system architectures having been designed in previous projects;
obtain, from the knowledge base, information of hardware components and software components of the similar computing system architectures;
obtain, from the knowledge base, dependencies between the hardware components and the software components; and
wherein the dialog structure is created based on the requirement definitions and information about the similar computing system architectures obtained from the knowledge base.

20. The computer system of claim 15, further comprising program instructions executable to:
in response to determining that the ongoing topic is completed in the discussion, determine whether all topics in the dialog structure are completed in the discussion;
in response to determining that all the topics in the dialog structure are completed in the discussion, provide the participants with a report on results of the discussion.

* * * * *